Patented Aug. 4, 1931

1,817,582

UNITED STATES PATENT OFFICE

SHERMAN W. PUTNAM AND NOLAND POFFENBERGER, OF MIDLAND, MICHIGAN, ASSIGNORS TO THE DOW CHEMICAL COMPANY, OF MIDLAND, MICHIGAN, A CORPORATION OF MICHIGAN

CLEANING COMPOSITION

No Drawing. Application filed April 7, 1930. Serial No. 442,444.

The present invention relates to that class of materials known as solvents and more especially to compositions suitable for general dry cleaning and spotting work. Accordingly, among the objects of the present invention is the production of an efficient and economical cleaner that is non-inflammable, highly detergent and easily recoverable. Other objects and advantages will appear as the description proceeds.

To the accomplishment of the foregoing and related ends, the invention, then, consists of the features hereinafter fully described and particularly pointed out in the claims, the following description setting forth in detail several approved combinations of ingredients embodying our invention, such disclosed means constituting, however, but several of various forms in which the principle of the invention may be used.

At the present time there are a large number of solvent type dry cleaners on the market. Commonest among such cleaners is naphtha and following this come gasoline and mixtures of these containing carbon tetrachloride or even carbon tetrachloride alone in some cases. The use of naphtha or gasoline alone presents the disadvantages of inflammability and danger of explosion. Carbon tetrachloride on the other hand while non-inflammable has an inherent tendency to hydrolyze and weaken most fabrics cleaned in it after hydrolysis has started. Within the past few years a cleaner consisting of a mixture of carbon tetrachloride and ethylene dichloride has been brought into use for some purposes. However, as is well known to the art, ethylene dichloride is a good solvent for cellulose acetate silks and accordingly it has to be used rather carefully to prevent injury to the fabric being cleaned.

We have discovered that a very superior solvent for dry cleaning and spotting purposes is produced by mixing carbon tetrachloride and propylene dichloride (30 to 70 per cent). Propylene dichloride does not dissolve cellulose acetate silks at room temperature as does ethylene dichloride, and among other desirable properties it acts to minimize the tendency of carbon tetrachloride to form rings when used for spotting purposes due in part to its raising the boiling point range of the solution. It further dissolves oil and grease (especially lard or butter grease spots) and permits its ready removal while carbon tetrachloride alone tends to spread the oil. Propylene dichloride further has a higher flash point than ethylene dichloride which in itself tends to reduce the fire hazard involved in its use and makes a relatively smaller amount of high priced carbon tetrachloride necessary to produce an excellent and non-inflammable composition. We have further discovered that ethylene dichloride can be added to our carbon tetrachloride, propylene dichloride mixture to form a solvent composition that for practically all purposes is superior to anything now on the market. Our work with this solvent shows that each of the ingredients tends to remove or dissolve certain greases and soils better than others and that the combination of the three thus produces a highly efficient cleaner. It is also to be noted in connection with this mixture that the tendency of carbon tetrachloride to form rings and the tendency of ethylene dichloride to dissolve cellulose acetate silks is suppressed or reduced to a point where it is negligible. The explosion hazard when using this mixture is also reduced to a minimum even when using as low as 30 per cent carbon tetrachloride, due largely to the use of propylene dichloride. It is further to be noted that the amount of hydrolyzed product formed from the carbon tetrachloride in the mixture is reduced by the presence of propylene dichloride and ethylene dichloride to a point where the fabric being cleaned is seldom stained due to the fluid attacking metallic buttons or fasteners thereon as is more commonly the case when using carbon tetrachloride alone, and further the attack on the fabric itself is reduced to a point where it is of no consequence. When using a mixture of these three materials we have found that preferably the carbon tetrachloride should be in excess of 30 per cent, the propylene dichloride content should range between 10 and 65 per cent and the ethylene dichloride between 5 and 50 per cent. As a specific composition adaptable for most purposes we prefer to use a composition consisting of 50 per cent carbon tetrachloride, 25 per cent propylene dichloride, and 25 per cent ethylene dichloride.

While we have given specific ranges of composition which we have found best adaptable for general dry cleaning and spotting purposes, it will be readily understood by those versed in the art that other proportions of these materials could be used and further that they could be diluted with other materials such as naphtha, gasoline, or the like, without departing from the spirit of our invention.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:—

1. A composition of matter consisting of a mixture of carbon tetrachloride and propylene dichloride.

2. A composition of matter consisting of a mixture of carbon tetrachloride, propylene dichloride and ethylene dichloride.

3. A composition of matter consisting of from 30 to 70 per cent. of carbon tetrachloride mixed with from 70 to 30 per cent. of propylene dichloride.

4. A composition of matter consisting of from 30 to 70 per cent. of carbon tetrachloride, 10 to 65 per cent. of propylene dichloride and 5 and 50 per cent. of ethylene dichloride.

5. A composition of matter consisting of carbon tetrachloride 50 per cent., propylene dichloride 25 per cent. and ethylene dichloride 25 per cent.

6. A solvent including a mixture of carbon tetrachloride and propylene dichloride.

7. A solvent including a mixture of carbon tetrachloride, propylene dichloride and ethylene dichloride.

8. A cleaning and spotting fluid consisting of a mixture of carbon tetrachloride and propylene dichloride.

9. A cleaning and spotting fluid consisting of a mixture of carbon tetrachloride, propylene dichloride and ethylene dichloride.

10. A cleaning and spotting fluid consisting of a mixture of from 30 to 70 per cent. of carbon tetrachloride and 70 to 30 per cent. of propylene dichloride.

11. A cleaning and spotting fluid consisting of from 30 to 70 per cent. of carbon tetrachloride, 10 to 65 per cent. of propylene dichloride and 5 to 50 per cent. of ethylene dichloride.

12. A cleaning and spotting fluid consisting of carbon tetrachloride 50 per cent., propylene dichloride 25 per cent. and ethylene dichloride 25 per cent.

Signed by us this 4th day of April, 1930.
SHERMAN W. PUTNAM.
NOLAND POFFENBERGER.